United States Patent
De Angelis et al.

(10) Patent No.: US 7,588,527 B2
(45) Date of Patent: Sep. 15, 2009

(54) PROCESS FOR THE DISPOSAL OF SULFUR IN THE FORM OF COMPOUNDS LIQUID AT ROOM TEMPERATURE

(75) Inventors: Alberto De Angelis, Legnano (IT); Paolo Pollesel, San Donato Milanese (IT); Giuseppe Bellussi, Piacenza (IT); Thomas Paul Lockhart, Lodi (IT)

(73) Assignees: ENI S.p.A., Rome (IT); ENITECNOLOGIE S.p.A., San Donato Milanese-Milano (IT)

( * ) Notice: Subject to any disclaimer, the term of this patent is extended or adjusted under 35 U.S.C. 154(b) by 423 days.

(21) Appl. No.: 10/562,674

(22) PCT Filed: Jul. 6, 2004

(86) PCT No.: PCT/EP2004/007565
§ 371 (c)(1),
(2), (4) Date: Jun. 19, 2006

(87) PCT Pub. No.: WO2005/014192
PCT Pub. Date: Feb. 17, 2005

(65) Prior Publication Data
US 2007/0048087 A1    Mar. 1, 2007

(30) Foreign Application Priority Data
Jul. 18, 2003   (IT) .......................... MI2003A1469

(51) Int. Cl.
*B09B 3/00*   (2006.01)
*H01M 4/58*   (2006.01)
(52) U.S. Cl. ........................ 588/249; 588/250; 588/414; 405/129.25; 423/561.1
(58) Field of Classification Search ................ 588/300, 588/414, 249; 423/561.1, 562, 565; 405/129.25
See application file for complete search history.

(56) References Cited

U.S. PATENT DOCUMENTS

| 3,690,377 | A | | 9/1972 | Knight | |
| 3,920,424 | A | * | 11/1975 | Estep et al. | 96/207 |
| 4,428,700 | A | | 1/1984 | Lennemann | |
| 4,773,483 | A | * | 9/1988 | Paul | 166/270 |
| 4,966,736 | A | * | 10/1990 | Harbolt et al. | 264/11 |
| 6,582,025 | B2 | | 6/2003 | Pickren | |
| 2007/0193939 | A1 | * | 8/2007 | Hawes et al. | 210/279 |

OTHER PUBLICATIONS

Calculating Friction Loss, Source: http://www.pmengineer.com/Articles/Feature_Article/8202daa96248a010VgnVCM100000f932a8c0.*
Swanson et al. "Pipe flow measurements over a wide range of Reynolds numbers using liquid helium and various gases", Journal of Fluid Mechanics, 2002, 461, 51-60.*
Winter et al. "An Experimental Study on the Kinetics of the Formation and Decomposition of Sulfanes in the Sulfur/H2S System", Ind. Eng. Chem. Res. 1996, 35, 1257-1262.*
GMELIN Handbook of Organic Chemistry, Supp. vol. 4A/B, ed. 8, pp. 391-394, 1983. XP-002268680.

* cited by examiner

*Primary Examiner*—Roy King
*Assistant Examiner*—Rebecca Lee
(74) *Attorney, Agent, or Firm*—Oblon, Spivak, McClelland, Maier Neustadt, P.C.

(57) ABSTRACT

Process for the disposal of sulfur in the liquid state which comprises: a) transforming elemental sulfur into sulfanes having the general formula $H_2S_{n+1}$, wherein n is a number from 1 to 7; b) optionally mixing elemental sulfur in powder form with the liquid sulfanes, up to such a concentration as to guarantee the pumpability of the mixture; c) injecting the sulfanes liquid at room temperature into geological formations having a temperature lower than 150° C.

17 Claims, No Drawings

PROCESS FOR THE DISPOSAL OF SULFUR IN THE FORM OF COMPOUNDS LIQUID AT ROOM TEMPERATURE

CROSS REFERENCE TO RELATED APPLICATION

This application is a 371 of PCT/EP04/007565, filed on Jul. 6, 2004, and claims priority of Italian Application No. MI 2003 A001469, filed on Jul. 18, 2003.

The present invention relates to a new process for the disposal of sulfur in the form of derivatives in the liquid state at room temperature.

More specifically, the present invention relates to a new process for the disposal of sulfur coming from the purification treatment of hydrocarbons of a fossil nature, for example crude oil or natural gas.

It is well known that sulfur can be present in considerable quantities in both extracted crude oil and natural gas. In this gas, the sulfur can be present in the form of $H_2S$ in a molar percentage quantity which can reach 10% and in certain particular cases it can even exceed 20%, referring to gas.

When present in high concentrations in gas, the hydrogen sulfide is separated using various systems, of which the most widely used is absorption in solutions of ethanolamines. Once it is in the concentrated state, hydrogen sulfide is transformed into elemental sulfur by means of the Claus process. At this point, it is necessary to allocate the sulfur which, for the last few years and potentially for tens of years to come, has a market characterized by an excessive offer with respect to the demand. Sulfur is normally stored in elemental form as huge blocks which require continual monitoring and treatment of the run off water to avoid the acidification of the ground and surrounding underground water. In addition to this, there is an increasingly strict legislation on the part of states containing oil fields or natural gas reservoirs, which in some cases impose heavy penalties for the storage of recovered sulfur.

The Applicants have now found an innovative process for the elimination of said large quantities of sulfur which envisages its injection by pumping it into adequate geological structures in the form of compounds, more specifically as sulfanes, which are in the liquid state at room temperature. Sulfanes are compounds characterized by an extremely high weight content of sulfur, which varies from 97% ($H_2S_2$) to 99.2% ($H_2S_8$).

In another embodiment it is possible to use synthesized sulfanes as a solvent for dissolving additional elemental sulfur, in order to reduce the quantity of sulfur to be converted into sulfanes for its elimination.

The structures, to which the accumulation of sulfur in the form of sulfanes is destined, can consist of the field itself from which the crude oil or associated gas has been extracted or other adequate deep geological structures, such as abandoned mines or saline aquifers. With the use of sulfanes, it is also possible to adopt, as structures for the storage of sulfur, geological formations whose temperature is much lower than the melting point of sulfur (119° C.). As they are already liquid at room temperature, they can, in fact, also be stored in structures in which, if molten sulfur in the pure state were pumped, this would immediately solidify causing the obstruction of the pumps and pipe-lines.

Thanks to the solution, object of the present invention, a permanent sulfur storage is obtained without any risk of its leaving the surface and contaminating usable groundwater or negatively interfering with the extraction process of crude oil/gas. Large accumulations of sulfur do in fact exist in nature in deep geological structures which are indefinitely stable and do not have any negative impact on the surrounding environment.

An object of the present invention therefore relates to a process for the disposal of sulfur as derivatives, more specifically as sulfanes, which are in the liquid state at room temperature, and which comprises:

a) transforming elemental sulfur into sulfanes having the general formula $H_2S_{n+1}$, wherein n is a number from 1 to 7;

b) optionally mixing elemental sulfur in powder form or in the molten phase, with the liquid sulfanes, up to such a concentration as to guarantee the pumpability of the mixture;

c) injecting the sulfanes liquid at room temperature into geological formations which can also have a temperature lower than the melting point of sulfur (119° C.), to a temperature close to room temperature.

Preferably, the temperature of the geological formation is lower than 150° C. (boiling point of the lightest sulfane i.e. $H_2S_2$).

Sulfanes are products which are known in scientific literature and can be prepared according to at least two techniques. The first comprises the direct reaction between sulfur in the molten state and hydrogen sulfide wherein, depending on the molar ratios between the reagents, a mixture of sulfanes having different compositions, is obtained. Details on the synthesis of sulfanes according to this technique can be found in Ullmann's Encyclopedia of Industrial Chemistry, Vol. A25, (1994), VCH.

A second preparation technique, described in Gmelin Handbuch der Anorganische Chemie Sulfur Vol. 4a/b (1983), Springer-Verlag Heidelberg, comprises at least two passages according to the following reaction schemes:

$$S+Cl_2 \rightarrow SCl_2$$

$$nSCl_2+H_2S \rightarrow H_2S_{n+1}+xHCl$$

wherein n represents a number ranging from 1 to 7 and x depends on the stoichiometry of the reaction.

As the hydrochloric acid produced can be difficult to dispose of, the HCl formed can, for example, be oxidized with air in the presence of a catalyst based on copper chloride and produce $Cl_2$, according to what takes place, for example, in the Deacon process, which can be recycled to the preparation system of sulfanes.

Elemental sulfur in the molten state, or in the form of a finely ground powder to favour its solubility/dispersibility, can also be added to the sulfanes. For example, sulfur can be added in powder form with a particle size ranging from 1 to 100 μm up to a concentration corresponding to the solubility limits, in order to avoid excessively increasing the viscosity of the mixture.

The present invention implies pumping sulfanes in liquid form through surface pipes, well pipes and receiving geological structures. The elemental sulfur used in the synthesis of sulfanes can come directly from the Claus process or from a surface storage site.

The pressure necessary for pumping the liquid obtained from the transformation of elemental sulfur into sulfane can be calculated with the general formula:

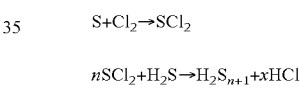

$$\Delta P = 2f \cdot \rho \cdot u_m^2 L/D_{eq}$$

wherein L is the length of piping used for injection into the geological structure, $D_{eq}$ its equivalent diameter, $u_m$ the average rate of the fluid pumped, ρ the density of the fluid pumped and f the friction factor which is a function of the roughness of the pipe and Reynolds number:

$$Re = D_{eq} \cdot u_m \cdot \rho / \mu$$

wherein μ is the kinematic viscosity of the fluid. The pumping device can be represented by a conventional pump.

In particular, the viscosity and density of the sulfanes liquid at room temperature, in relation to the number of sulfur atoms, are indicated in Table 1 enclosed.

TABLE 1

Density and viscosity of sulfanes (20° C.) in relation to the sulfur atoms in the $H_2S_n$ molecule

| Nr. sulfur atoms in the molecule | ρ (g/cm³) | μ (cPoise) |
|---|---|---|
| 2 | 1.23 | 0.616 |
| 3 | 1.49 | 1.32 |
| 4 | 1.58 | 2.63 |
| 4.7 | 1.626 | 4.19 |
| 5 | 1.633 | 4.65 |
| 6 | 1.685 | 11.1 |
| 6.2 | 1.695 | 14.2 |
| 6.4 | 1.701 | 14.9 |
| 7.6 | 1.731 | 24.5 |

Geological structures which are appropriate for receiving the sulfur transformed into sulfane are preferably those forming the reservoir itself from which the crude oil or natural gas containing sulfur in the form of organic compound or hydrogen sulfide, are extracted. Alternatively, geological structures can be used, in a remote position with respect to the reservoir and having structural characteristics suitable for receiving and preserving the sulfanes. A particularly important aspect of the present invention is that geological structures whose temperature is much lower than the melting point of sulfur (119° C.) can also be used for the storage of sulfur, in the form of sulfanes, reaching those reservoirs whose temperature is close to room value (25° C.). In this way, it is therefore possible to use geological structures which are unsuitable for the accumulation of sulfur in the molten state in which the latter, due to the local temperature which is lower than its melting point, would solidify, thus blocking the pumps and pipes.

For the application of the present invention, either matrix geological structures or fractured structures, naturally or induced, can generally be used. In all cases, the pressure and maximum injection flow-rate of the fluid forming sulfanes in the liquid state, can be determined by calculations and measurements well known to experts in stimulation treatment of production wells or the production and running of water re-injection wells.

Some illustrative and non-limiting examples are provided for a better understanding of the present invention and for its embodiment.

EXAMPLE 1

Direct Synthesis of Sulfanes from $H_2S$ and Sulfur 10 g (0.312 moles) of sulfur powder were placed in a 500 ml Hastelloy C autoclave, equipped with a mechanical stirrer, and 34 g (1 mole) of gaseous $H_2S$ were charged. The closed autoclave was heated to 200° C. for 24 h, maintaining the internal contents under stirring.

The autoclave was then cooled to room temperature and degassed. The autoclave was subsequently flushed by the passage of a stream of nitrogen for 30 minutes, in order to remove the non-reacted hydrogen sulfide.

The solid contained in the autoclave is melted at 120° C. and is distilled at reduced pressure (15 mmHg) collecting 0.15 g of an olive-yellow coloured oily liquid consisting of a mixture of sulfanes, which upon elemental analysis proved to have an empirical formula of $H_2S_{3.4}$. Said mixture of sulfanes is characterized at room temperature by a density of 1.53 g/cm³ ad a viscosity of 1.84 CPoise. As the viscosity of a common crude oil (Brent) is about 30 CPoise, the pumping of the above mixture of sulfanes proved to be a simple operation for conventional equipment for the extraction of crude oil.

Sulfur in the molten state has a viscosity of about 12 CPoise, which is almost 7 times higher than the mixture of sulfanes. From an energy point of view, it is consequently more convenient to pump sulfur in the form of sulfane rather than in the molten state.

EXAMPLE 2

Synthesis in Two Passages of Sulfanes from $H_2S$ and Sulfur Using Chlorine

First Passage: Synthesis of Sulfur Chloride.

20 g of sulfur powder were placed in a 500 ml flask, equipped with a mechanical stirring anchor and reflux bubble cooler. Gaseous chlorine was then passed through the sulfur, perfectly anhydrified, until all the sulfur mass had melted producing a dark red-coloured liquid. 0.5 g of $FeCl_3$ were subsequently added and anhydrified chlorine was continually passed for a further thirty minutes. The dark red liquid was then distilled, collecting the fraction which distills at between 55 and 62° C. 14.2 g of pure $SCl_2$ were obtained.

Second Passage: Synthesis of Sulfanes.

32.37 g of $H_2S$ (0.952 moles), to which 14 g of $SCl_2$ (0.136 moles) were slowly added, were charged into a 1 liter autoclave, previously anhydrified and cooled to −10° C., and the mixture was maintained under stirring for 30 minutes. The autoclave was subsequently degassed and flushed with nitrogen. The gas at the outlet consisted of a mixture of non-reacted $H_2S$ and HCl formed during the reaction. A deep yellow-coloured liquid, having a weight of 13.6 g, was formed in the autoclave.

Upon elemental analysis, this liquid proved to consist of hydrogen and sulfur with an empirical formula of $H_2S_{4.5}$. In this compound, the chlorine is only present in traces demonstrating that the reaction has been completed. The mixture of sulfanes previously obtained is characterized at room temperature by a density of 1.60 g/cm³ and a viscosity of 3.64 CPoise. As the viscosity of a common crude oil (Brent) is about 30 CPoise, the pumping of the above mixture of sulfanes proved to be a simple operation for conventional equipment for the extraction of crude oil.

Under these conditions, the sulfur is solid and it cannot therefore be pumped, but also in the molten state its viscosity, equal to about 12 CPoise, is higher than the previous mixture of sulfanes and it was consequently more convenient, from an energy point of view, to pump the sulfur in the form of sulfane rather than in the molten state.

The invention claimed is:

1. A process for the disposal of sulfur, comprising:
   transforming elemental sulfur into at least one liquid state sulfane having the formula $H_2S_{n+1}$, wherein n is a number from 1 to 7; and injecting said at least one liquid state sulfane at room temperature into a geological formation, said formation having a temperature of from room temperature to 150° C.

2. The process according to claim 1, wherein said transforming comprises directly reacting sulfur in the molten state with hydrogen sulfide.

3. The process according to claim 2, further comprising generating said elemental sulfur by the Claus processes prior to said transforming.

4. The process according to claim 1, further comprising obtaining said elemental sulfur in the form of blocks from a sulfur storage site prior to said transforming.

5. The process according to claim 1, wherein said transforming occurs according to reaction schemes (1) and (2):

$$S + Cl_2 \rightarrow SCl_2 \tag{1}$$

$$n\, SCl_2 + H_2S \rightarrow H_2S_{n+1} + x\, HCl \tag{2}$$

wherein n represents a number ranging from 1 to 7 and x depends on the stoichiometry of the reaction.

6. The process according to claim 5, further comprising oxidizing the hydrochloric acid obtained thereby with air in the presence of a catalyst to produce $Cl_2$ and recycling the $Cl_2$ produced thereby.

7. The process according to claim 1, wherein the difference in pressure necessary for pumping said at least one liquid state sulfane is described by the formula:

$$\Delta P = 2 f \cdot \rho \cdot \mu_m^2 L / D_{eq}$$

wherein
L is the length of piping for said injecting
$D_{eq}$ is the equivalent diameter of the piping,
$\mu_m$ the average rate of the fluid pumped,
$\rho$ the density of the fluid pumped and
f the friction factor which is a function of the roughness of the pipe and Reynolds number:

$$Re = D_{eq} \cdot \mu_m \cdot \rho / \mu$$

wherein $\mu$ is the viscosity of the fluid.

8. The process according to claim 1, further comprising purifying hydrocarbons or natural gas to obtain the sulfur.

9. The process according to claim 1, further comprising obtaining said elemental sulfur from crude oil or natural gas which is present in said geological formation prior to said injecting.

10. The process according to claim 1, further comprising dissolving elemental sulfur within said at least one liquid state sulfane, wherein said elemental sulfur is in the molten state or in the form of a finely ground powder having a particle size of from 1 to 100 μm, and dissolved up to a concentration corresponding to the solubility limit.

11. The process according to claim 1, where sulfur is present in said at least one liquid state sulfane at a weight content ranging from 97% to 99.2% by weight of said at least one liquid state sulfane.

12. The process according to claim 1, wherein said at least one liquid state sulfane exhibits a viscosity of from 0.616 to 11.1 CPoise at 20° C.

13. The process according to claim 1, wherein said at least one liquid state sulfane is represented by average formula:

$$H_2S_{3.4}$$

and has a viscosity of 1.84 CPoise.

14. The process according to claim 1, wherein said at least one liquid state sulfane is represented by average formula:

$$H_2S_{4.5}$$

and has a viscosity of 3.64 CPoise.

15. The process according to claim 13, wherein said at least one liquid state sulfane has a density of 1.53 g/cm³.

16. The process according to claim 14, wherein said at least one liquid state sulfane has a density of 1.60 g/cm³.

17. The process according to claim 5, wherein $FeCl_3$ is present during the reaction of scheme 1.

* * * * *